(12) United States Patent
Yang et al.

(10) Patent No.: US 11,051,069 B2
(45) Date of Patent: Jun. 29, 2021

(54) APPARATUS AND METHOD FOR PROVIDING SERVICE IN DIGITAL BROADCASTING SYSTEM

(71) Applicant: Samsung Electronics Co., Ltd., Suwon-si (KR)

(72) Inventors: Hyun-Koo Yang, Seoul (KR); Mun-Seok Kim, Hwaseong-si (KR); Sung-Hee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 16/083,990

(22) PCT Filed: Mar. 13, 2017

(86) PCT No.: PCT/KR2017/002701
§ 371 (c)(1),
(2) Date: Sep. 11, 2018

(87) PCT Pub. No.: WO2017/155371
PCT Pub. Date: Sep. 14, 2017

(65) Prior Publication Data
US 2020/0296448 A1    Sep. 17, 2020

(30) Foreign Application Priority Data

Mar. 11, 2016  (KR) .................. 10-2016-0029891

(51) Int. Cl.
*H04N 21/438*   (2011.01)
*H04N 21/262*   (2011.01)
(Continued)

(52) U.S. Cl.
CPC ....... *H04N 21/4383* (2013.01); *H04N 21/262* (2013.01); *H04N 21/442* (2013.01); *H04N 21/6332* (2013.01)

(58) Field of Classification Search
CPC ............ H04N 21/4383; H04N 21/262; H04N 21/442; H04N 21/6332; H04N 21/235; H04N 21/266
See application file for complete search history.

(56) References Cited

U.S. PATENT DOCUMENTS

| | | | | |
|---|---|---|---|---|
| 5,539,451 | A | * | 7/1996 | Carey et al. ............. H04N 7/16 725/138 |
| 2003/0022643 | A1 | * | 1/2003 | Djupsjobacka et al. .................... H04N 21/235 455/158.1 |

(Continued)

FOREIGN PATENT DOCUMENTS

| | | |
|---|---|---|
| CN | 1507277 A | 6/2004 |
| CN | 101690181 A | 3/2010 |

(Continued)

OTHER PUBLICATIONS

Chinese Office Action with English translation dated Jun. 1, 2020; Chinese Appln. No. 201780016726.6.

(Continued)

*Primary Examiner* — Alexander Gee
(74) *Attorney, Agent, or Firm* — Jefferson IP Law, LLP

(57) ABSTRACT

Various embodiments of the present disclosure propose an apparatus and method for supporting a service for one program through a channel change in a digital broadcasting system. To this end, a broadcast providing device may monitor whether a channel switching event occurs while providing a service for a first program on a first channel on the basis of a predetermined broadcast program schedule. When the channel switching event occurs, before the service for the first program on the first channel ends according to the predetermined broadcast program schedule, the broadcast providing device may transmit, to a broadcast consumer device, connection control information required to continue (Continued)

the service for the first program on a second channel. The broadcast consumer device may perform service switching on the basis of the connection control information.

20 Claims, 7 Drawing Sheets

(51) Int. Cl.
*H04N 21/442* (2011.01)
*H04N 21/6332* (2011.01)
*H04N 19/46* (2014.01)
*H04N 21/4722* (2011.01)

(56) References Cited

U.S. PATENT DOCUMENTS

| | | | |
|---|---|---|---|
| 2004/0114052 A1* | 6/2004 | Sin | H04N 21/4383 |
| | | | 348/570 |
| 2005/0204396 A1 | 9/2005 | Kang | |
| 2005/0251845 A1* | 11/2005 | McDowell | H04N 21/4383 |
| | | | 725/126 |
| 2008/0066103 A1* | 3/2008 | Ellis et al. | H04N 7/16 |
| | | | 725/38 |
| 2008/0271078 A1 | 10/2008 | Gossweiler et al. | |
| 2010/0178040 A1* | 7/2010 | Yamada et al. | H04N 5/00 |
| | | | 386/334 |
| 2010/0263016 A1 | 10/2010 | Itoga | |
| 2011/0187932 A1 | 8/2011 | Kobayashi et al. | |
| 2011/0311205 A1 | 12/2011 | McClanahan et al. | |
| 2012/0066727 A1* | 3/2012 | Nozoe et al. | H04N 21/235 |
| | | | 725/88 |
| 2013/0239163 A1 | 9/2013 | Kim et al. | |
| 2014/0028915 A1 | 1/2014 | Kim et al. | |
| 2015/0163531 A1 | 6/2015 | Gilberton et al. | |
| 2016/0234533 A1* | 8/2016 | Soares et al. | H04N 21/235 |
| 2018/0098111 A1 | 4/2018 | Yang et al. | |

FOREIGN PATENT DOCUMENTS

| | | |
|---|---|---|
| CN | 102348132 A | 2/2012 |
| CN | 104471953 A | 3/2015 |
| JP | 5316542 B2 | 10/2013 |
| KR | 10-2008-0067197 A | 7/2008 |
| KR | 10-2013-0136369 A | 12/2013 |
| KR | 10-1373731 B1 | 3/2014 |
| KR | 10-1383292 B1 | 4/2014 |
| KR | 10-2016-0123942 A | 10/2016 |

OTHER PUBLICATIONS

European Search Report dated Dec. 13, 2018; European Appln. No. 17763631.3-1208.

* cited by examiner

APPARATUS AND METHOD FOR PROVIDING SERVICE IN DIGITAL BROADCASTING SYSTEM

CROSS-REFERENCE TO RELATED APPLICATION(S)

This application is a National Phase Entry of PCT International Application No. PCT/KR2017/002701, which was filed on Mar. 13, 2017 and claims priority under 35 U.S.C. § 119 of Korean Patent Application No. 10-2016-0029891, filed on Mar. 11, 2016, in the Korean Intellectual Property Office the disclosure of which is incorporated herein by reference in its entirety.

TECHNICAL FIELD

The present disclosure relates to a service providing apparatus and method thereof for supporting a program in a digital broadcasting system.

BACKGROUND ART

A digital broadcasting system provides a user with a service according to various programs. The service according to the various programs provided to the user means performance of an overall operation which makes the user to enable to watch or listen a content which corresponds to a corresponding program through a specific channel. In this case, the digital broadcasting system may transmit signaling information as well as content data which corresponds to a program. The signaling information may include meta information required for a multimedia device to select, receive, and play a program.

The digital broadcasting system may perform a series of operations for servicing a program designated per channel according to a preset broadcast programming schedule. For example, the digital broadcasting system may transmit signaling information including meta information, and/or the like which corresponds to a broadcast programming schedule through a broadcast network, and broadcast content data which corresponds to a program designated per channel and time based on the transmitted signaling information.

SUMMARY

There may be a program which may not be serviced according to a broadcast programming schedule among programs serviced by a digital broadcasting system. That is, a case that it needs to provide the next program even though one program may not be provided to the user until the end of the one program for reasons such as programming, and/or the like may occur. For example, in a case of a sports broadcast, it may be difficult to exactly predict a time point at which a game is over. So, if game time becomes long, a case that the sports broadcast may be stopped for servicing the next program such as news, and/or the like may occur.

According to various embodiments of the present disclosure, an apparatus and method for supporting a service for one program through channel change may be provided in a digital broadcasting system.

According to various embodiments of the present disclosure, an apparatus and method for transmitting signaling information for a terminal apparatus to support a service for one program through channel change in a broadcast providing apparatus which supports a digital broadcasting service may be provided in a digital broadcasting system.

According to various embodiments of the present disclosure, an apparatus and method for supporting a service for one program through channel change based on signaling information transmitted by a broadcast providing apparatus in a terminal apparatus may be provided in a digital broadcasting system.

A method for providing a broadcasting service in a broadcast providing apparatus according to various embodiments of the present disclosure may include monitoring whether a channel change event occurs in a situation that a service of a first program is provided on a first channel based on a broadcast programming schedule preset for the first channel, and if the channel change event occurs, transmitting linkage control information required for servicing the first program on a second channel before the service of the first program is terminated on the first channel by the broadcast programming schedule preset for the first channel.

A broadcast providing apparatus for providing a broadcasting service according to various embodiments of the present disclosure may include a communication unit configured to transmit linkage control information required for receiving a first program on a second channel before a service of the first program is terminated on a first channel by a broadcast programming schedule preset for the first channel, and a processor configured to monitor whether a channel change event occurs in a situation that the service of the first program is provided on the first channel based on the preset broadcast programming schedule, and to control the communication unit to transmit the linkage control information if the channel change event occurs.

A method for providing a broadcasting service in a terminal apparatus according to various embodiments of the present disclosure may include receiving linkage control information from a broadcast providing apparatus in a situation that a service of a first program is provided on a first channel based on a broadcast programming schedule preset for the first channel, and servicing the first program on a second channel if a channel change time point comes based on the linkage control information.

A terminal apparatus for providing a broadcasting service according to various embodiments of the present disclosure may include a communication unit configured to receive linkage control information from a broadcast providing apparatus in a situation that a service of a first program is provided on a first channel based on a broadcast programming schedule preset for the first channel, and a processor configured to service the first program on a second channel if a channel change time point comes based on the linkage control information.

According to various embodiments of the present disclosure, it is possible to efficiently provide a digital broadcasting service by enabling to fully service a program which a user is watching without interruption from a program perspective.

DETAILED DESCRIPTION OF THE DISCLOSURE

Figure 1:
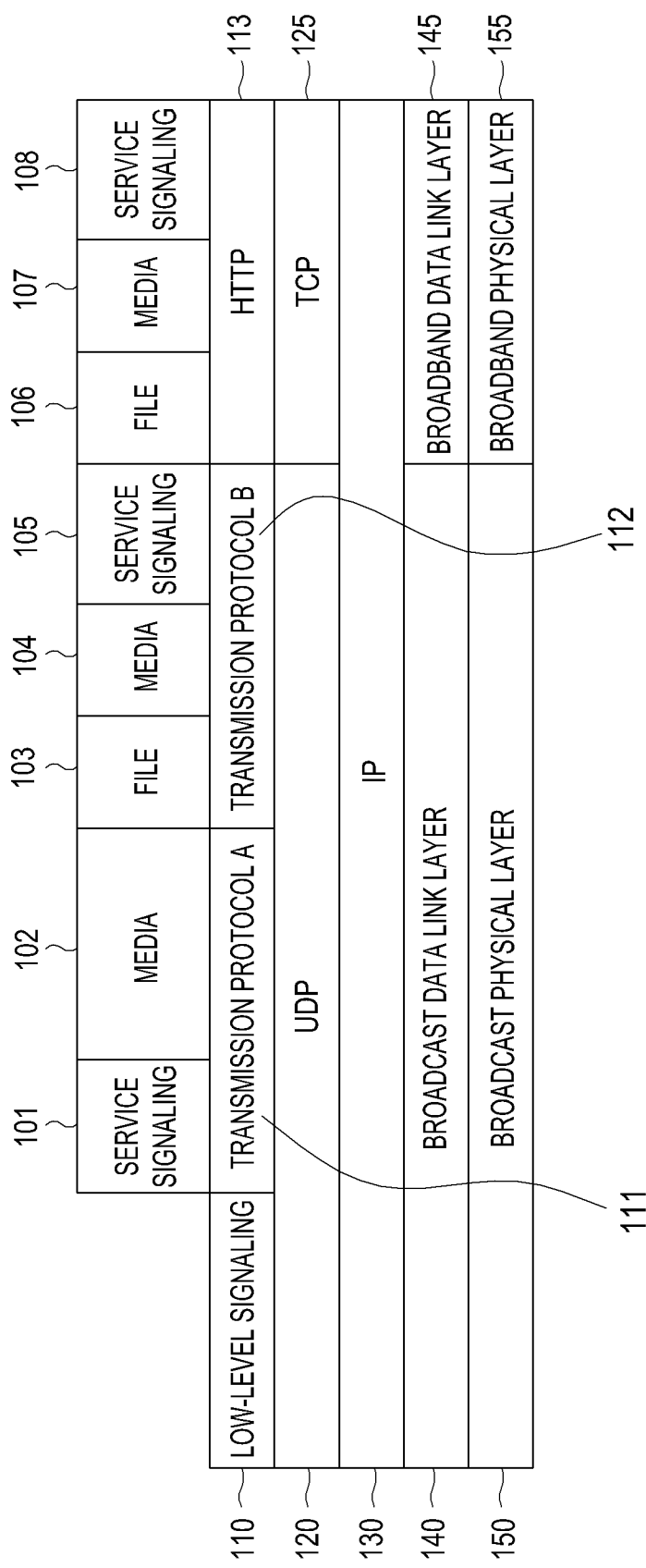
FIG. 1 illustrates an example of a protocol stack for supporting a broadcasting service in a broadcast providing apparatus in a broadcasting system according to an embodiment of the present disclosure.

Various embodiments of the present disclosure are described with reference to the accompanying drawings. However, the scope of the present disclosure is not intended to be limited to the particular embodiments and it is to be understood that the present disclosure covers various modifications, equivalents, and/or alternatives falling within the scope and spirit of the present disclosure. In relation to a description of the drawings, like reference numerals denote the same components.

In the present disclosure, the term 'have', 'may have', 'include', or 'may include' signifies the presence of a specific feature (for example, number, function, operation, or component such as part), not excluding the presence of one or more other features.

In the present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance, not limiting the components. These expressions are used to distinguish one component from another component. For example, a first user device and a second user device may indicate different user devices irrespective of sequence or importance. For example, a first component may be referred to as a second component and vice versa without departing the scope of the present disclosure.

When it is said that a component (for example, a first component) is 'operatively or communicatively coupled with/to' or 'connected to' another component (for example, a second component), it should be understood that the one component is connected to the other component directly or through any other component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used herein may be replaced with, for example, the term 'suitable for' 'having the capacity to', 'designed to', 'adapted to', 'made to', or 'capable of' under circumstances. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the operations.

The terms as used in the present disclosure are provided to describe merely specific embodiments, not intended to limit the scope of other embodiments. It is to be understood that singular forms include plural referents unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the present disclosure may not be interpreted as excluding embodiments of the present disclosure.

According to various embodiments of the present disclosure, a terminal device is a user terminal equipped with communication functionalities, which should be able to use various programs according to digital broadcasting through various communication networks. The terminal device may be classified into, for example, a portable type-electronic device, a wearable type-electronic device, a cradle type-electronic device, an installed type-electronic device, and/or the like.

The portable electronic device may include at least one of a smart phone, a tablet personal computer (PC), a mobile phone, a video phone, an e-book reader, a personal digital assistant (PDA), a portable multimedia player (PMP), an MP3 player, a mobile medical equipment, an electronic dictionary, a camcorder, a camera, or an electronic picture frame.

A major example of the wearable electronic device is a wearable device. According to various embodiments, the wearable device may be at least one of an accessory type (for example, a watch, a ring, a bracelet, an ankle bracelet, a necklace, glasses, contact lenses, swimming goggles, or a head-mounted device (HMD)), a fabric or clothes type (for example, electronic clothes or a sports wear), an attached type (for example, a skin pad or a tattoo), or an implantable type (for example, an implantable circuit).

The stationary electronic device may be at least one of a navigator, a laptop personal computer (PC), or a netbook computer.

The installed electronic device may be at least one of a desktop personal computer (PC), a workstation, a medical equipment, or a surveillance camera such as a closed circuit television (CCTV).

According to some embodiments, a terminal device may be at least one of furniture, part of a building/structure, an electronic board, an electronic signature receiving device, a projector, or various measuring devices (for example, water, electricity, gas, electro-magnetic wave measuring devices, and/or the like). In one embodiment, a terminal device may be one or a combination of two or more of the foregoing devices. In an example, an electronic device may be a flexible electronic device. In addition, the terminal device is not limited to the foregoing devices, and may include a new electronic device produced along with technology development.

Terminologies to be used in various embodiments to be proposed in the present disclosure will be defined below.

Broadcast network: A linkage system where a plurality of broadcast providing apparatuses (e.g., a server of a broadcasting system, and/or the like) are wired or wirelessly linked to exchange a program one another, or service a program to a broadcast consuming apparatus (e.g., a subscriber terminal apparatus, and/or the like). The broadcast network may include a linkage which transmits, from a broadcast providing apparatus to a broadcast consuming apparatus, service signaling, media, a file, and/or the like for servicing a program based on a plurality of transmission protocols.

Broadband network: A linkage system where a plurality of information pieces such as video, voice, digital information, and/or the like are interactively transmitted using a carrier frequency of tens of MHz to hundreds of MHz within the same cable using a coaxial cable or an optical fiber cable. The broadband network may include a linkage which transmits, from a broadcast providing apparatus to a broadcast consuming apparatus, service signaling, media, a file, and/or the like for servicing a program based on a determined transmission protocol.

Broadcast programming schedule: A program schedule which a broadcast providing server will service per broadcasting time.

Program: It refers to a content which is provided from a broadcast providing apparatus to a broadcast consuming apparatus through a broadcast network or a broadband network according to a preset broadcasting programming schedule.

Service continuity: It means that a program which has been serviced through an original channel is continuously serviced through a new channel.

Service replacement: It means that a broadcast consuming apparatus automatically changes to a new broadcasting service when an original broadcasting service ends.

Broadcasting service: It means a series of operations in which a broadcast providing apparatus provides a broadcast consuming apparatus with a specific program through a specific channel in order that the specific program may be watched through the specific channel in the broadcast consuming apparatus in a broadcast network or a broadband network. The broadcasting service may be identified by a combination of a channel and a program. For example, provision of a program A through the first channel may be referred to as the first broadcasting service, and provision of the program A through the second channel may be referred to as the second broadcasting service. For another example, according to a broadcast programming schedule, provision of a program A through the first channel at the first time may be referred to as the first broadcasting service, and provision of the program A through the first channel at the second time may be referred to as the second broadcasting service. In this case, the first time and the second time do not have overlapped time.

Original broadcasting service: A service which has been provided by a broadcast providing apparatus before service continuity or service replacement.

New broadcasting service: A service which will be provided by a broadcast providing apparatus after service continuity or service replacement.

Channel: A delivery path for data which uses a predetermined resource allocated for a broadcast providing apparatus to provide a broadcast consuming apparatus with a broadcasting service.

Original channel: A channel through which a broadcast providing apparatus has provided an original broadcasting service.

New channel: A channel which a broadcast providing apparatus designates or allocates for providing a new broadcasting service.

Linkage: Linkage for a broadcast providing apparatus and a broadcast consuming apparatus to change from an original channel for one program to a new channel or another channel Linkage control information: Control information provided from a broadcast providing apparatus to a broadcast consuming apparatus for the broadcast providing apparatus and the broadcast consuming apparatus to perform a linkage.

Channel change event: A channel change event occurs in a case that a broadcast providing apparatus determines that there is a need for changing to a new broadcasting service since it is impossible to maintain an original broadcasting service by considering a broadcast programming schedule, and/or the like.

Hereinafter, various embodiments of the present disclosure will be described with reference to accompanying drawings.

FIG. 1 illustrates an example of a protocol stack for supporting a broadcasting service in a broadcast providing apparatus in a broadcasting system according to an embodiment of the present disclosure.

Referring to FIG. 1, a broadcast providing apparatus may transmit, to a broadcast consuming apparatus, all or part of service signaling, media, and a file according to a broadcasting service through a broadcast network and/or a broadband network. The broadcast providing apparatus may transmit, to the broadcast consuming apparatus, all or part of the service signaling, the media, and the file based on a plurality of transmission protocols.

The broadcast providing apparatus may use, for example, two transmission protocols which are based on a broadcast network and one protocol which is based on a broadband network. The two transmission protocols which are based on the broadcast network may be a transmission protocol A 111 and a transmission protocol B 112, and the one protocol which is based on the broadband network may be a hypertext transfer protocol (HTTP) 113.

The broadcast providing apparatus may transmit, to the broadcast consuming apparatus, all or part of the service signaling, the media, and the file according to the broadcasting service using one of the broadcast network and the broadband network.

Upon using the broadband network, the broadcast providing apparatus may use the HTTP 113 as an example of a transmission protocol. An output of the HTTP 113 may be transmitted to the broadcast consuming apparatus after being sequentially processed through a TCP 125, an IP 130, a broadband data link layer 145, and a broadband physical layer 155.

Upon using the broadcast network, the broadcast providing apparatus may allocate each of information or data according to the transmission protocol A 111, the transmission protocol B 112, and low-level signaling (LLS) 110 to a separate UDP 120 session. Each of the information or the data according to the transmission protocol A 111, the transmission protocol B 112, and the low-level signaling 110 may be encapsulated as a packet through, for example, an allocated UDP 120 and IP 130. The encapsulated packet may be processed in a broadcast data link layer 140 and a broadcast physical layer 150 and transmitted, to the broadcast consuming apparatus through the broadcast network.

Information or data according to the low-level signaling LLS may be transmitted in a form of a table with a simple structure. In this case, the information or data according to the low-level signaling 110 may be transmitted without passing the transmission protocol A 111 or the transmission protocol B 112. The information or data according to the low-level signaling 110 may include information which is not related to a transmission protocol and information about an entry point. An embodiment of configuration for the low-level signaling 110 will be described below.

According to an embodiment, the transmission protocol A 111 may be used for transmitting service signaling 101 and media 102, and the transmission protocol B 112 may be used for transmitting service signaling 105, media 104, and a file 103. However, this is just one example, so a type of data which transmission protocols may transmit may be varied according to implementation. The HTTP 113 may be used for transmitting service signaling 108, media 107, and a file 106.

The following <Table 1> shows an example of an LLS table for transmitting the low-level signaling 110 according to an embodiment of the present disclosure.

TABLE 1

| Syntax | No. of Bits | Format |
|---|---|---|
| LLS_table( ) { | | |
|     LLS_table_id | 8 | uimsbf |
|     provider_id | 8 | uimsbf |
|     LLS_table_version | 8 | uimsbf |
|     switch (LLS_table_id) { | | |
|         case 0x01: | | |
|             SLT | var | Sec. 6.3 |
|             break; | | |
|         case 0x02: | | |
|             RRT | var | See Annex F |
|             break; | | |
|         case 0x03: | | |
|             SystemTime | var | Sec. 6.4 |
|             break; | | |

TABLE 1-continued

| Syntax | No. of Bits | Format |
|---|---|---|
|         case 0x04: | | |
|             CAP | var | Sec. 6.5 |
|             break; | | |
|         default: | | |
|             reserved | var | |
|     } | | |
| } | | |

Meaning of each field in <Table 1> will be described below.

LLS_table_id: An identifier indicating an attribute of information transmitted through the following field.

provder_id: A provider of a service to which information transmitted through an LLS table is applied.

LLS_table_version: A version of information transmitted through the following field.

SLT: An XML document indicating a service list table. The SLT may be compressed using gzip, and/or the like.

A detailed description of RRT, System Time, CAP, and/or the like which correspond to ratings, system time, a disaster message, and/or the like for providing a broadcasting service which is not related to the technical spirit according to an embodiment proposed in the present disclosure will be omitted herein.

The SLT may include path information for obtaining basic information and service level signaling for a service. The basic information for the service may include information for identifying a service, information required for a broadcast consuming apparatus to determine whether it is possible to play the service, and/or the like. The information for identifying the service may be, for example, a service identifier, a service name, a channel number, and/or the like. The information required for the broadcast consuming apparatus to determine whether it is possible to play the service may be, for example, whether encapsulation is performed, whether it is necessary to be linked to a broadband network, required specification, and/or the like.

The following <Table 2> shows an example of an SLT according to an embodiment of the present disclosure.

TABLE 2

| Element or Attribute Name | Use | Data Type | Short Description |
|---|---|---|---|
| SLT | | | Root element of the SLT |
|   @bsid | 1 | unsignedShort | Identifier of the entire Broadcast Stream. |
|   @sltCapabilities | 0 . . . 1 | string | Required capabilities for decoding and meaningfully presenting the content for all the services in this SLT instance. |
|   sltInetUrl | 0 . . . 1 | anyURI | Base URL to acquire ESG or service layer signalling files available via broadband for services in this SLT. |
|     @urlType | 1 | unsignedByte | Type of files available with this URL |
|   Service | 1 . . . N | | Service information |
|     @serviceId | 1 | unsignedShort | Integer number that identifies this Service within the scope of this Broadcast area. |
|     @sltSvcSeqNum | 1 | unsignedByte | Version of SLT service info for this service. |
|     @protected | 0 . . . 1 | boolean | Indicates whether one or more components needed for meaningful presentation of this service are protected (e.g. encrypted). |
|     @majorChannelNo | 0 . . . 1 | 1 . . . 999 | Major channel number of the service |
|     @minorChannelNo | 0 . . . 1 | 1 . . . 999 | Minor channel number of the service |
|     @serviceCategory | 1 | unsignedByte | Service category, coded per Table 6.4 |
|     @shortServiceName | 0 . . . 1 | string | Short name of the Service |
|     @hidden | 0 . . . 1 | boolean | Indicates whether the service is intended for testing or proprietary use, and is not to be selected by ordinary TV receivers. |
|     @broadbandAccessRequired | 0 . . . 1 | boolean | Indicates whether broadband access is required for a receiver to make a meaningful presentation of the service. |

TABLE 2-continued

| Element or Attribute Name | Use | Data Type | Short Description |
| --- | --- | --- | --- |
| @svcCapabilities | 0 . . . 1 | string | Required capabilities for decoding and meaningfully presenting content of this service. |
| BroadcastSvcSignaling | 0 . . . 1 | | Location, protocol, address, id information for broadcast signaling |
| @slsProtocol | 1 | unsignedByte | Protocol used to deliver the service layer signalling for this service |
| @slsMajorProtocolVersion | 1 | unsignedByte | Major version number of protocol used to deliver Service Layer Signalling for this service. |
| @slsMinorProtocolVersion | 1 | unsignedByte | Minor version number of protocol used to deliver Service Layer Signalling for this service. |
| @slsPlpId | 0 . . . 1 | unsignedByte | PLP ID of the physical layer pipe carrying the broadcast SLS for this service. |
| @slsDestinationIpAddress | 1 | string | A string containing the dotted-IPv4 destination address of the packets carrying broadcast SLS data for this service. |
| @slsDestinationUdpPort | 1 | unsignedShort | Port number of the packets carrying broadcast SLS data for this service. |
| @slsSourceIpAddress | 1 | string | A string containing the dotted-IPv4 source address of the packets carrying broadcast SLS data for this service. |
| svcInetUrl | 0 . . . N | anyURI | URL to access Internet signalling for this service |
| @urlType | 1 | unsignedByte | Type of files available with this URL |

In <Table 2>, meaning of each element and attribute will be described below.

<SLT>—The most significant element of SLT.

@bsid: A unique identifier of a broadcast stream. The broadcast stream may be defined with a center frequency and a band width, and a value of bsid needs to be unique within an area.

@sltCapabilities: It defines specification required for playing all services specified in a corresponding SLT.

<sltInetUrl>: A URL of a broadband server from which ESG data or service signaling information for all services specified in a corresponding SLT may be obtained.

@URLtype: It means a type of a file which may be downloaded through a URL indicated by <sltInetUrl>, and a value of @URLtype follows <Table 3>.

TABLE 3

| URLtype | Meaning |
| --- | --- |
| 0 | Not specified |
| 1 | URL of Service Layer Signaling server |
| 2 | URL of ESG server |
| 3 | URL of Service Usage Data Gathering Report server |
| other values | Reserved for future use |

<Service>: Service information

@serviceId: A unique identifier which is configured with 16 bits. The @serviceId has a unique value within a broadcasting area.

@sltSvcSeqNum: @sltSvcSeqNum has a value meaning information about whether contents of each service defined in <SLT> is changed. The @sltSvcSeqNum has an integer value, and the @sltSvcSeqNum is increased by 1 whenever <Service> information description within the <SLT> is changed. The @sltSvcSeqNum resets to 0 after maximum value.

@protected: If @protected has a "true" value, it means that at least one of components which compose a service has been protected for displaying a corresponding service on a screen. A default value of @protected is "false".

@majorChannelNo: @majorChannelNo is an integer value which may have one value from 1 to 999. The @majorChannelNo means a major channel number of a corresponding service. This number is not a value which needs to be defined in a case of a service which a user does not directly select (for example, an ESG service and an EAS service).

@minorChannelNo: @minorChannelNo is an integer value which may have one value from 1 to 999. The @minorChannelNo means a minor channel number of a corresponding service. This number is not a value which needs to be defined in a case of a service which a user does not directly select (for example, an ESG service and an EAS service).

@serviceCategory: @serviceCategory is an 8-bit integer meaning a type of a corresponding service, and follows <Table 4>.

TABLE 4

| serviceCategory | Meaning |
| --- | --- |
| 0 | Not specified |
| 1 | Linear A/V service |
| 2 | Linear audio only service |
| 3 | App-based service |
| 4 | ESG service (program guide) |
| 5 | EAS service (emergency alert) |
| other values | Reserved for future use |

@shortServiceName: A name of a corresponding service.

@hidden: Information indicating whether a corresponding service is shown to a user upon scanning a service. A default value of @hidden is "false".

@broadbandAccessRequired: @broadbandAccessRequired is signaling data indicating whether to need to access a broadband network for meaningfully show a corresponding service to user. A default value of @broadbandAccessRequired is "false".

@svcCapabilities: @svcCapabilities is a specification which needs to be supported for meaningfully showing a corresponding service to user.

<BroadcastSvcSignaling>: Definition about a transmission protocol, a location, and identifier values of signaling transmitted through a broadcast network.

@slsProtocol: @slsProtocol indicates a protocol through which an SLS of a corresponding service is transmitted, and a value thereof follows <Table 5>.

TABLE 5

| slsProtocol | Meaning |
| --- | --- |
| 0 | Reserved |
| 1 | ROUTE |
| 2 | MMTP |
| other values | Reserved for future use |

@slsMajorProtocolVersion: A major version of a protocol through which an SLS of a corresponding service is transmitted.

@slsMinorProtocolVersion: A minor version of a protocol through which an SLS of a corresponding service is transmitted.

@slsPlpId: An identifier of a PLP through which an SLS is transmitted.

@slsDestinationIpAddress: A destination IP address value (IPv4) of SLS data.

@slsDestinationUdpPort: A destination port value of SLS data.

@slsSourceIpAddress: A source IP address value (IPv4) of SLS data.

<svcInetUrl>: A URL value from which signaling data related to an ESG service or a corresponding service may be downloaded.

@URLtype: @URLtype denotes a type of a file which may be downloaded through a URL indicated by <svcInetUrl>.

In a broadcasting service according to the present disclosure, one broadcasting provider (or a broadcast providing apparatus) may provide one or more services using one broadcast stream. The broadcast stream may be shared by a plurality of broadcasting providers. A broadcasting provider may provide a broadcasting service using a channel which supports a broadband network, not a broadcasting network. Further, each broadcasting service may be operated only during some time according to a broadcast programming schedule.

Figure 2:
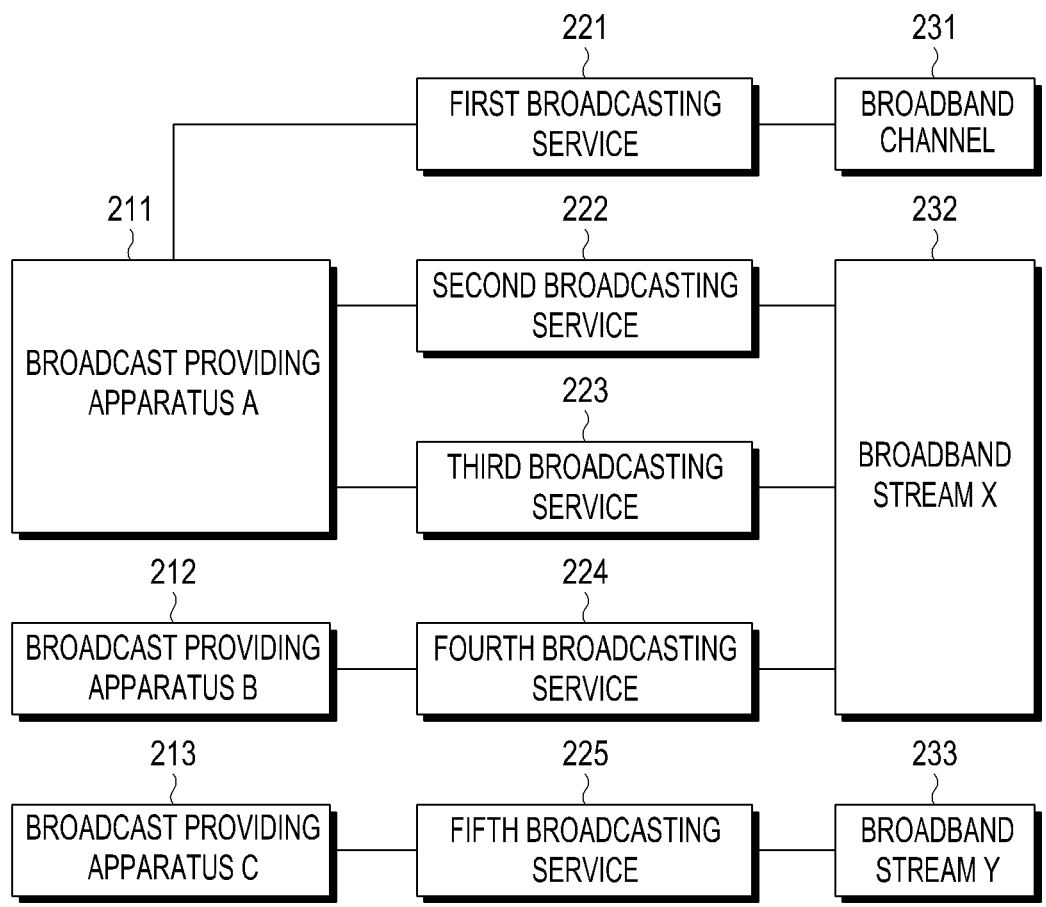
FIG. 2 illustrates an example of provision of a broadcasting service by a plurality of broadcast providing apparatuses according to an embodiment of the present disclosure.

FIG. 2 illustrates an example of provision of a broadcasting service by a plurality of broadcast providing apparatuses according to an embodiment of the present disclosure.

Referring to FIG. 2, it will be assumed that three providers (broadcast providing apparatuses A, B, and C) 211, 212, and 213 provide five broadcasting services 221, 222, 223, 224, and 225 through two broadcast streams 232 and 233 and one broadband channel 231.

According to an embodiment, the broadcast providing apparatus A 211 provides the first broadcasting service 221 to a broadcast consuming apparatus through the broadband channel 233, and provides the second broadcasting service 222 and the third broadcasting service 223 to the broadcast consuming apparatus through the broadband stream X 232. The broadcast providing apparatus B 212 provides the fourth broadcasting service 224 to the broadcast consuming apparatus through the broadband stream X 232. The broadcast providing apparatus C 213 provides the fifth broadcasting service 225 to the broadcast consuming apparatus through the broadband stream Y 233.

In the present disclosure, one broadcasting service may be configured by a program which is not overlapped on time. For example, a broadcasting service may be a program such as a baseball broadcast, news, a drama, and/or the like provided through an MBC UHD channel. In this case, a situation in which play time becomes longer unexpectedly may occur. When this situation occurs, it needs to stop a sports broadcast on the way for broadcasting a regular program such as the news, and/or the like.

Various embodiments of the present disclosure proposes a scheme of changing an original broadcasting service to a new broadcasting service to provide the new broadcasting service for guaranteeing a continuous provision of a broadcasting service for which a normal termination is not performed.

According to an embodiment, a broadcast providing apparatus may transmit linkage control information to a broadcast consuming apparatus while an original broadcasting service is maintained, and initiate a new broadcasting service based on the transmitted linkage control information before the original broadcasting service ends. The linkage control information may be defined as information which the broadcast consuming apparatus will use for using the new broadcasting service. For example, the linkage control information may be specification information which the broadcast consuming apparatus needs to have for providing a program which a user is watching through another service. Preferably, the linkage control information is defined by use information changed when the original broadcasting service is changed to the new broadcasting service.

For example, if the second broadcasting service 222 is changed to the first broadcasting service 221, it may be difficult for a broadcast consuming apparatus which is not linked to a broadband network to change to the first broadcasting service 221. The second broadcasting service 222 may be a sports broadcast which has been provided through the broadcast stream X 232, and the first broadcasting service 221 may be a sports broadcast which will be provided through the broadband channel 231.

So, a broadcasting system according to an embodiment of the present disclosure will prepare a scheme of defining linkage control information and transmitting the linkage control information from a broadcast providing apparatus to a broadcast consuming apparatus in order for the broadcast providing apparatus to receive and play another service according to channel change.

In the present disclosure, if there is a relationship such as program continuous broadcasting between the first service and the second service, and/or the like, it means that a linkage between the first service and the second service is generated, and information about the linkage may be included in linkage control information and the linkage control information may be transmitted. The linkage control information may be, for example, user service bundle description (USBD) such as 3GPP MBMS, ATSC 3.0, and ground wave UHDTV transmission/reception standards, and/or the like.

The linkage describes relationship among services, and an example of the linkage may be service continuity, service replacement, and/or the like. The service continuity may mean that the second service continuously provides a program which has been provided in the first service. At this time, the second service may be a service which is providing another program before providing a program or which is temporally generated for providing a program provided in the first service. The service replacement means that a broadcast consuming apparatus may automatically change to the second service when the first service is terminated.

The following <Table 6> shows an example of an SLT according to an embodiment of the present disclosure.

TABLE 6

| Element or Attribute Name | Use | Data Type | Description |
|---|---|---|---|
| serviceLinakge | 0 . . . 1 | | Service linkage information |
| @bsid | 0 . . . 1 | unsignedShort | Reference to the broadcast stream associated with the SLT which includes the target service as an entry. This attribute shall be present when the value Of @bsid in the SLT including the target service is different from the value of @bsid in the SLT including the current service. |
| @providerId | 0 . . . 1 | unsignedByte | Reference to the provider associated with the SLT which includes the target service as an entry. This attribute shall be present when the value of provider_id in the LLS table carrying the SLT including the target service as an entry is different from the value of provider_id in the LLS table carrying the SLT including the current service as an entry. |
| @targetSerivceID | 1 | unsignedShort | Reference to the target service entry in the SLT. The value of this attribute is the same value of serviceId assigned to the entry. |
| @linkageType | 1 | unsignedByte | The value is assigned according to the <표 6> in relation with the identifier that shows the linkage relationship between the current service and the target service. |
| @activationTime | 0 . . . 1 | dateTime | The first moment when the linkage of the current service and the target service is active (UTC). If not given, the linkage is assumed to have been activated at some time in the past. |
| @deActivationTime | 1 | dateTime | The last moment when the linkage of the current service and the target service is active (UTC). |
| linkageData | 1 | string | Data needed for defining the linkageData |
| @serviceCategory | 1 | unsignedByte | Service category, coded per <표 4>. The allowed values are: 1 (Linear A/V service), 2 (Linear audio only service) and 3 (App-based service) |
| @broadbandAccessRequied | 0 . . . 1 | boolean | Indicates whether broadband access is required for a receiver to make a meaningful presentation of the service. Default value is false. |
| @svcCapabilities | 1 | string | Required capabilities for decoding and meaningfully presenting content of this service, (resolution, codec 정보 포함) |

In <Table 6>, the meaning of each element and each attribute will be described below.

<serviceLinkage>: The most significant element of service linkage information.

@bsid: An identifier of a broadcast stream related to an SLT including a new broadcasting service (e.g., target service). The @bsid needs to exist if an SLT including an original broadcasting service and an SLT including a new broadcasting service are transmitted through different broadcast streams.

@provider_id: An identifier of a provider related to an SLT including a new broadcasting service (e.g., a target service) (for example, an identifier of a broadcast providing apparatus, and/or the like). The @provider_id needs to exist if an SLT including an original broadcasting service and an SLT including a new broadcasting service are provided by different providers (e.g., broadcast providing apparatuses).

@targetServiceID: An identifier of a new broadcasting service (e.g., a target service). The @targetServiceID has the same value of an service Id of a related SLT.

@linkageType: A linkage attribute. The @linkageType may be defined as the following <Table 7>.

TABLE 7

| linkageType | Meaning |
|---|---|
| 0 | Program Continuity<br>* The linkage relationship between the current service and the target service is activated after the @activationTime, and the linkage relationship with the current service is deactivated after the @deActivationTime |
| 1 | Service Replacement<br>* The target service can be automatically selected by the receiver at the @deActivationTime |
| other values | Reserved for future use |

@activationTime: The @activationTime indicates time at which a linkage is activated, and may be provided with UTC reference time. If this attribute is omitted, it is regarded that the linkage has been activated already.

@deactivationTime: The @deactivationTime indicates time at which a linkage is deactivated, and may be provided with UTC reference time.

<linkageData>—Data for linkage definition.

@servieCategory: An identifier indicating a type of a broadcasting service, and may follow <Table 4>. At this time, the @servieCategory may have a value corresponding to an ESG and an EAS service.

@broadbandAccessRequired: A value indicating whether there is a need for a linkage to a broadband network for receiving and playing a broadcasting service. A default value of the @broadbandAccessRequired is false, and if this attribute does not exist, it means that there is no need for a broadband network linkage.

@svcCapabilities: Specification required for playing a new broadcasting service (e.g., target service). The @svcCapabilities may include information related to resolution and codec.

Figure 3:
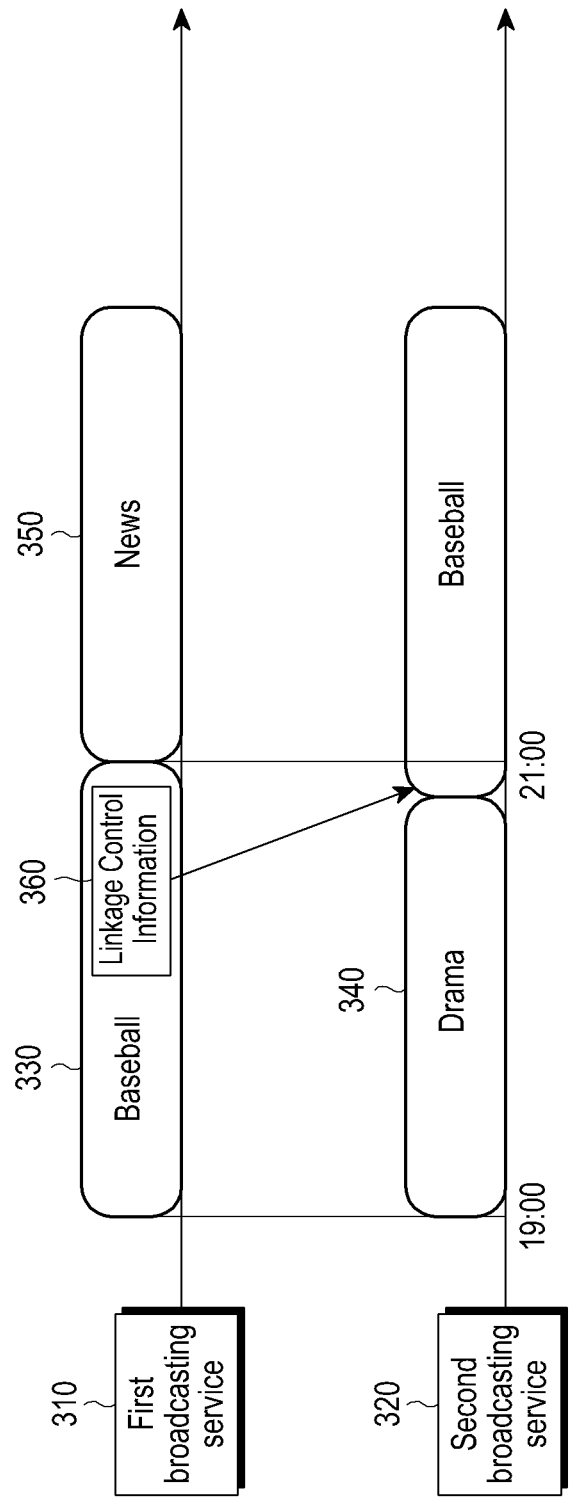
FIG. 3 illustrates one scenario for a service continuity procedure according to an embodiment of the present disclosure.

FIG. 3 illustrates one scenario for a service continuity procedure according to an embodiment of the present disclosure.

Referring to FIG. 3, it will be assumed that the first broadcasting service 310 and the second broadcasting service 320 are operated. For example, according to a broadcast programming schedule, the first broadcasting service 310 provides a baseball broadcast 330 from 19:00 and provides news 350 from 21:00, and the second broadcasting service 320 provides a drama 340 from 19:00. In this case, if the baseball broadcast 330 becomes longer in the first broadcasting service 310, a broadcast providing apparatus may include linkage control information 360 into signaling for the first broadcasting service 310 to transmit the signaling for the first broadcasting service 310 to a broadcast consuming apparatus. That is, the broadcast providing apparatus may transmit linkage control information 360 for a service change to the broadcast consuming apparatus when the baseball broadcast 330 is provided in the first broadcasting service 310.

Thereafter, the broadcast providing apparatus may provide news 350 in the first broadcasting service 310 and provide a baseball broadcast in the second broadcasting service 320 before the baseball broadcast 330 ends in the first broadcasting service 310 according to a broadcast programming schedule. The baseball broadcast by the second broadcasting service 320 may be provided before the news 350 is provided in the first broadcasting service 310. For example, the baseball broadcast 330 may be provided in the second broadcasting service 320 from 20:55 before the news 350 is provided in the first broadcasting service 310.

In the description, change of program which is provided through one channel is regarded as the same broadcasting service, however, this may be regarded as different broadcasting services. For example, a broadcasting service which provides the baseball broadcast 330 will be referred to as the first broadcasting service, and a broadcasting service which provides the news 350 after terminating the baseball broadcast 330 will be referred to as the third broadcasting service.

According to an embodiment, signaling by a broadcast providing apparatus may be transmitted repetitively. In this case, the linkage control information 360 may be given as shown in <Table 5>. At this time, in the linkage control information 360 transmitted along with the first broadcasting service 310 before 20:55, @linkageType may have a value 0, @activationTime may be given as 20:55, and @deactivationTime may be given as 21:00.

For another example, @deactivationTime may be given as 21:05 as a value after time at which the baseball broadcast 330 is stopped in the first broadcasting service 310. At this time, a broadcast consuming apparatus may determine whether a service change is possible using information included in the linkage control information 360 and change a service between @activationTime and @deactivationTime.

Figure 4:
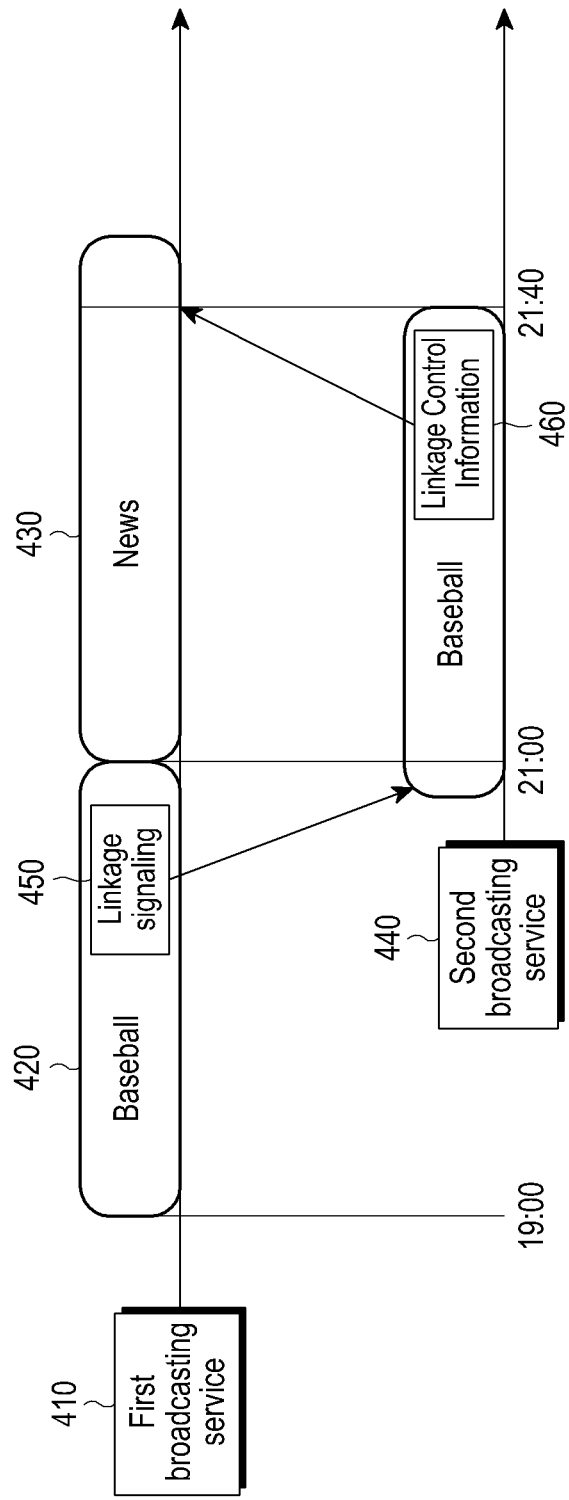
FIG. 4 illustrates one scenario for a service replacement procedure according to an embodiment of the present disclosure.

FIG. 4 illustrates one scenario for a service replacement procedure according to an embodiment of the present disclosure.

Referring to FIG. 4, it will be assumed that the first broadcasting service 410 is operated. For example, according to a broadcast programming schedule, the first broadcasting service 410 provides a baseball broadcast 420 from 19:00 and provides news 430 from 21:00. In this case, if the baseball broadcast 420 becomes longer in the first broadcasting service 410, a broadcast providing apparatus may include linkage control information 450 into signaling for the first broadcasting service 410 to transmit the signaling for the first broadcasting service 410 to a broadcast consuming apparatus. That is, the broadcast providing apparatus may transmit linkage control information 450 for a service change to the broadcast consuming apparatus when the baseball broadcast 420 is provided in the first broadcasting service 410.

Thereafter, the broadcast providing apparatus may provide the news 430 in the first broadcasting service 410 and generate the second broadcasting service 440 before the baseball broadcast 420 ends in the first broadcasting service 410 according to a broadcast programming schedule. The baseball broadcast by the second broadcasting service 440 may be provided before the news 430 is provided in the first broadcasting service 410. For example, a baseball broadcast may be provided in the second broadcasting service 440 from 20:55 before the news 430 is provided in the first broadcasting service 410.

In the description, change of program which is provided through one channel is regarded as the same broadcasting service, however, this may be regarded as different broadcasting services. For example, a broadcasting service which provides the baseball broadcast 420 will be referred to as the first broadcasting service, and a broadcasting service which provides the news 430 after terminating the baseball broadcast 420 will be referred to as the third broadcasting service.

According to an embodiment, signaling by a broadcast providing apparatus may be transmitted repetitively. In this case, the linkage control information 450 may be given as shown in <Table 5>. At this time, in the linkage control information 450 transmitted along with the first broadcasting service 410 before 20:55, @linkageType may have a value 0, @activationTime may be given as 20:55, and @deactivationTime may be given as 21:00.

For another example, @deactivationTime may be given as 21:05 as a value after time at which the baseball broadcast 420 is stopped in the first broadcasting service 410. At this time, a broadcast consuming apparatus may determine whether a service change is possible using information included in the linkage control information 450 and change a service between @activationTime and @deactivationTime.

The broadcast providing apparatus may transmit, to the broadcast consuming apparatus, linkage control information 460 along with data according to the second broadcasting service 440 before a baseball broadcast by the second broadcasting service 440 does not end, that is, while the baseball broadcast by the second broadcasting service 440 is provided.

For example, in the linkage control information 460 transmitted while the baseball broadcast by the second broadcasting service 440 is provided, @linkageType may have a value of 1, and @deactivationTime may be given as 21:40. In this case, the broadcast consuming apparatus may determine whether a service change is possible using information included in the linkage control information 460, and may change to a predefined starting screen or an arbitrary service for which reception or play is possible if broadcast consuming apparatus changes to the first broadcasting service 410 before @deactivationTime or the service change is impossible.

Figure 5:
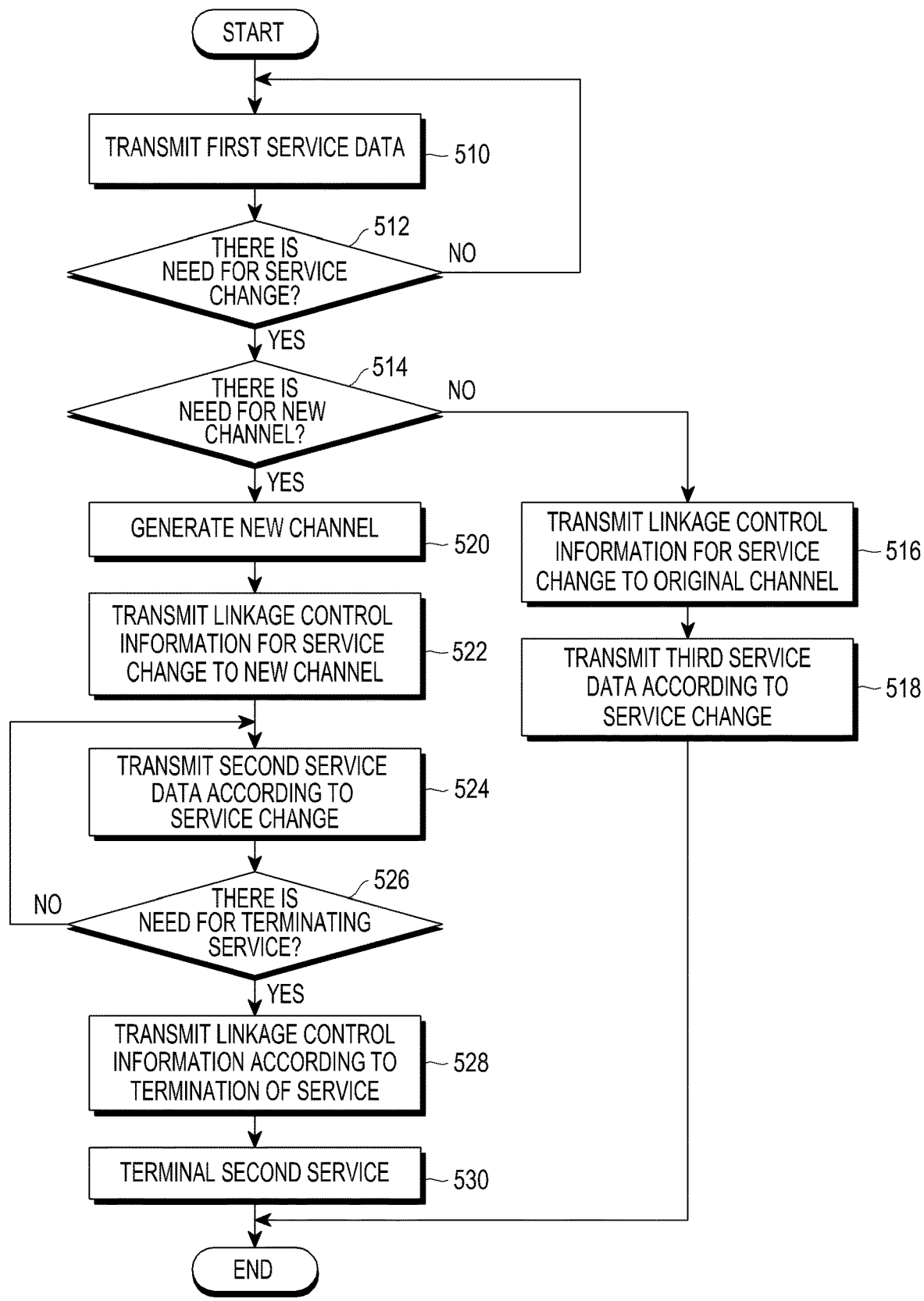
FIG. 5 illustrates control flow performed in a broadcast providing apparatus according to an embodiment of the present disclosure.

FIG. 5 illustrates control flow performed in a broadcast providing apparatus according to an embodiment of the present disclosure.

Referring to FIG. 5, a broadcast providing apparatus may transmit data according to the first broadcasting service (the first service data) when the first broadcasting service is initiated (operation 510). The broadcast providing apparatus may determine whether there is a need for a service change while transmission of the first service data is performed (operation 512). The broadcast providing apparatus may monitor whether a channel change event occurs in a situation that the first broadcasting service which provides a service of the first program on the first channel is provided based on, for example, a preset broadcast programming schedule.

According to an embodiment, a broadcast providing apparatus may recognize that a channel change event occurs if it is predicted that the service of the first program will not end until a program ending time point set for the first program based on a preset broadcast programming schedule.

The broadcast providing apparatus may determine whether there is a need for a new channel for the service change upon determining that there is the need for the service change (operation 514). The broadcast providing apparatus may determine whether there is a need for the new channel according to whether there is a channel which may provide a program according to the first broadcasting service by considering, for example, a preset broadcast programming schedule. That is, if there is a channel on which the service change is possible among channels which have been generated, the broadcast providing apparatus may determine that there is no need for generating the new channel. However, if there is no channel on which the service change is possible among the channels which have been generated, the broadcast providing apparatus may determine that there is a need for generating the new channel.

Upon determining that there is no need for the new channel, the broadcast providing apparatus may configure linkage control information for a service change to one of channels which have been generated already to transmit the configured linkage control information to a broadcast consuming apparatus (operation 516). The broadcast providing apparatus may transmit the linkage control information along with, for example, the data according to the first broadcasting service.

The broadcast providing apparatus may transmit data according to the third broadcasting service (the third service data) for service continuity to the broadcast consuming apparatus based on the linkage control information (operation 518). For example, the broadcast providing apparatus may terminate the program which has been provided by the first service at linkage deactivated time included in the linkage control information and initiate the third broadcasting service at linkage activated time included in the linkage control information. The third broadcasting service may mean provision of a program which has been provided as the first broadcasting service on the third channel which has been generated. In this case, the broadcast providing apparatus may terminate another program if the another program is serviced on the third channel at the linkage activated time.

Upon determining that there is the need for the new channel, the broadcast providing apparatus may generate the new channel for the service change (operation 520). The broadcast providing apparatus may configure linkage control information for the service change to the generated new channel to transmit the configured linkage control information to a broadcast consuming apparatus (operation 522). The broadcast providing apparatus may transmit the linkage control information along with, for example, the data according to the first broadcasting service.

The broadcast providing apparatus may transmit data according to the second broadcasting service (the second service data) for service continuity to the broadcast consuming apparatus based on the linkage control information (operation 524). For example, the broadcast providing apparatus may terminate the program which has been provided by the first service at linkage deactivated time included in the linkage control information and initiate the second broadcasting service at linkage activated time included in the linkage control information. The second broadcasting service may mean provision of a program which has been provided as the first broadcasting service on the second channel which has been generated already. In this case, the broadcast providing apparatus may terminate another program if the another program is serviced on the second channel at the linkage activated time.

After the second broadcasting service is initiated, the broadcast providing apparatus may determine whether there is a need for terminating the service while transmission of the second service data is performed (operation 526). For example, the broadcast providing apparatus may determine that there is a need for ending the second broadcasting service through the newly generated channel when a program for which a service is changed ends (for example, when a baseball game ends).

Upon determining that there is the need for terminating the service, the broadcast providing apparatus may configure link control information for service replacement according to the end of the service to transmit the configured linkage control information to the broadcast consuming apparatus (operation 528). The broadcast providing apparatus may transmit the linkage control information along with, for example, the data according to the second broadcasting service.

After transmitting the link control information for the service replacement, the broadcast providing apparatus may terminate the second broadcasting service (operation 530).

Figure 6:
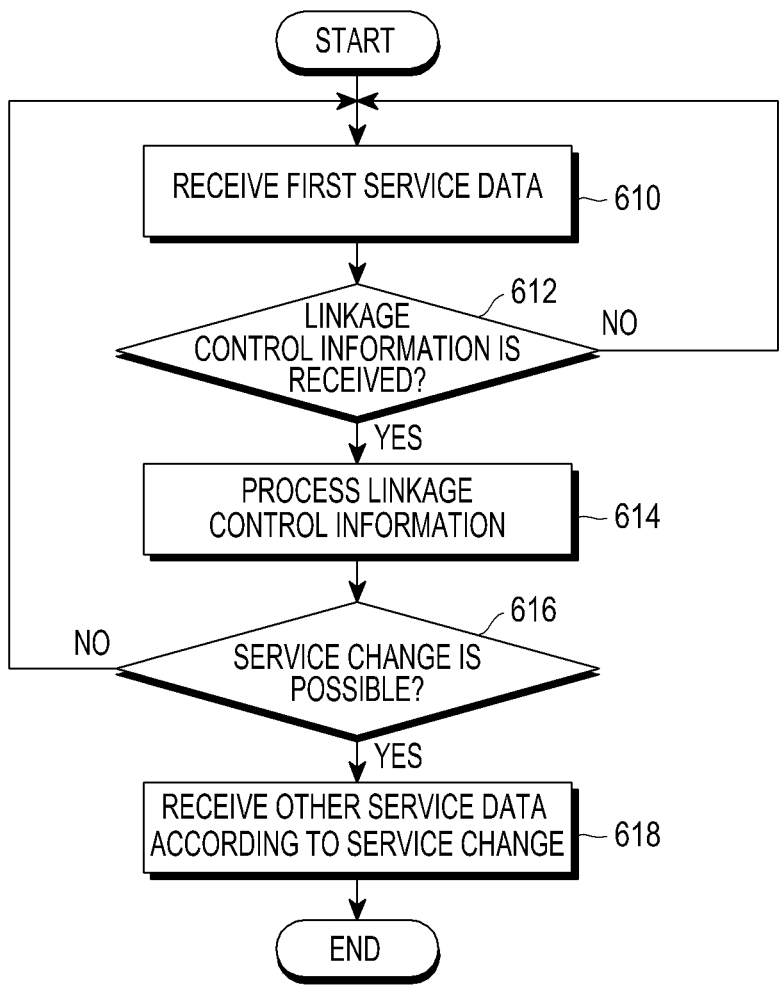
FIG. 6 illustrates control flow performed in a broadcast consuming apparatus according to an embodiment of the present disclosure.

FIG. 6 illustrates control flow performed in a broadcast consuming apparatus according to an embodiment of the present disclosure.

Referring to FIG. 6, a broadcast consuming apparatus may receive the first service data according to the first broadcasting service if the first broadcasting service is selected by a user (operation 610). The broadcast consuming apparatus may monitor whether linkage control information is received along with the first broadcasting data (operation 612).

Upon receiving the linkage control information, the broadcast consuming apparatus may process the received linkage control information (operation 614). For example, the broadcast consuming apparatus may generate a broadcasting schedule for continuously providing a program which is currently being watched through service change according to the linkage control information.

The broadcast consuming apparatus may determine whether service change is possible based on the processed result for the linkage control information (operation 616). For example, the broadcast consuming apparatus may determine whether the service change is possible by considering whether a channel is usable for the service change, user's permission for the service change, and/or the like.

The broadcast consuming apparatus may continuously receive the first service data according to the first broadcasting service as an original broadcasting service if the service change is impossible. The broadcast consuming apparatus may terminate reception of the first service data according to the first broadcasting service as the original broadcasting service and receive another service data according to the service change if the service change is possible (operation 618). For example, a baseball broadcast which is watched through the first broadcasting service may be continuously watched by changing to another channel (a channel designated by linkage control information).

According to an embodiment, if @linkageType included in linkage control information is 0, a broadcast consuming apparatus may change to a target service according to user's selection. If the @linkageType included in the linkage control information is 1, the broadcast consuming apparatus may perform change to the target service regardless of the user's selection.

Figure 7:
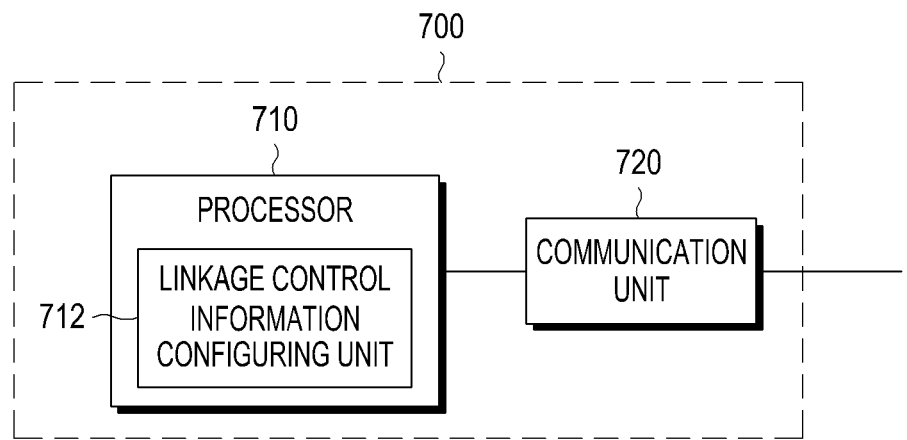
FIG. 7 illustrates a block diagram of a broadcast providing apparatus according to an embodiment of the present disclosure.

FIG. 7 illustrates a block diagram of a broadcast providing apparatus 700 according to an embodiment of the present disclosure.

Referring to FIG. 7, a communication unit 720 may transmit linkage control information for change to a new broadcasting service before an original broadcasting service ends. The original broadcasting service may be a service which provides a specific program on an original channel according to a preset broadcast programming schedule. The new broadcasting service may be, for example, a service which provides the specific program on a new channel.

According to an embodiment, linkage control information may include a linkage attribute, linkage activated time, and linkage deactivated time. The linkage attribute is an indicator for determining a scheme of performing a linkage, the linkage activated time may indicate a time point at which a service of the first program will be initiated on the second channel, and the linkage deactivated time may indicate a time point at which the service of the first program will be terminated on the first channel.

A processor 710 may include linkage control information configuring unit 712. The processor 710 may monitor whether a channel change event occurs in a situation that an original broadcasting service is provided based on the preset broadcast programming schedule. If the channel change event occurs, the processor 710 may configure the linkage control information and control the communication unit 720 to transmit the configured linkage control information.

According to an embodiment, the processor 710 may terminate an original broadcasting service at linkage deactivated time included in linkage control information, and initiate a new broadcasting service at linkage activated time included in the linkage control information. The processor 710 may recognize that a channel change event occurs if it is predicted that a service of a corresponding program will not end until an ending time point (a program ending time point) of a program which is provided by the original broadcasting service based on a preset broadcast programming schedule.

The processor 710 may provide a service of the next program following an original program on a channel on which the original broadcasting service has been provided based on a preset broadcast programming schedule if a program ending time point of the original broadcasting service elapses after transmitting linkage control information.

The processor 710 may terminate another program if the another program is serviced on a channel on which a new broadcasting channel will be provided at linkage activated time. The processor 710 may generate a new channel for the new broadcasting channel An operation performed by a broadcast providing apparatus which has the configuration as described above will be understood with reference to an operation which has been described with reference to FIG. 5.

Figure 8:
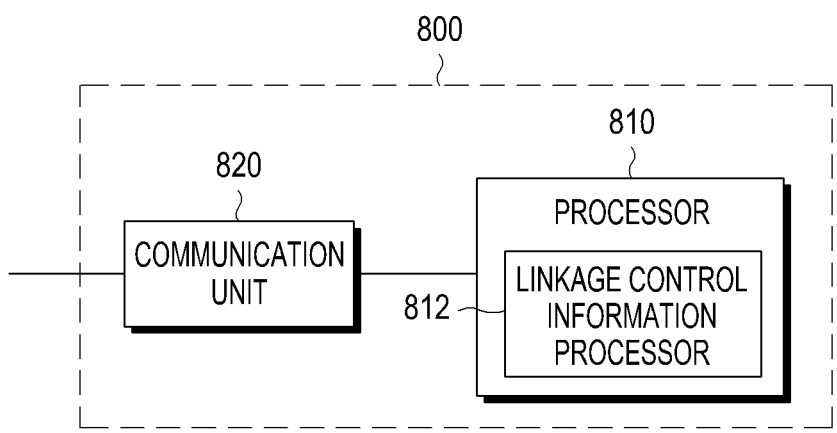
FIG. 8 illustrates a block diagram of a broadcast consuming apparatus according to an embodiment of the present disclosure.

FIG. 8 illustrates a block diagram of a broadcast consuming apparatus 800 according to an embodiment of the present disclosure.

Referring to FIG. 8, a communication unit 820 may receive, from a broadcast providing apparatus, linkage control information along with data according to an original broadcasting service based on a preset broadcast programming schedule.

According to an embodiment, the linkage control information may include a linkage attribute, linkage activated time, and linkage deactivated time. Here, the linkage attribute is an indicator for determining a scheme of performing a linkage, the linkage activated time indicates a time point at which the service of the first program will be initiated on the second channel, and the linkage deactivated time may indicate a time point at which the service of the first program will be terminated on the first channel A processor 810 may include linkage control information processor 812. The processor 810 may perform change to a new broadcasting service after terminating an original broadcasting service if a channel change time point comes based on the linkage control information.

An operation performed by a broadcast consuming apparatus which has the configuration as described above will be understood with reference to an operation which has been described with reference to FIG. 6.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for providing a broadcasting service in a broadcast providing apparatus, comprising:
    monitoring whether a channel change event occurs while a current service of a first program is provided on a first channel based on a broadcast programming schedule of the first channel; and
    if the channel change event occurs, transmitting, to a terminal apparatus, linkage control information required for receiving a target service related to the first program on a second channel before the current service of the first program is terminated on the first channel by the broadcast programming schedule,
    wherein the linkage control information includes:
        a linkage type indicator for indicating a linkage relationship between the current service and the target service as either a program continuity or a service replacement, a linkage activation time indicating a first moment when a linkage of the current service of the first program and the target service is active, and a linkage deactivation time indicating a last moment when the linkage of the current service of the first program and the target service is active, wherein the first channel is provided through a broadcast channel and the second channel is provided through a broadband channel, wherein, in response to the linkage type indicator being set to a first value indicating the program continuity, the linkage relationship between the current service and the target service is activated after the first moment indicated by the linkage activation time, and the linkage relationship with the current service is deactivated after the last moment indicated by the linkage deactivation time, and wherein, in response to the linkage type indicator being set to a second value indicating the service replacement, the target service is selected by the terminal apparatus at the last moment indicated by the linkage deactivation time.

2. The method of claim 1, wherein the channel change event comprises:

recognizing that it is expected that the current service of the first program is not terminated at a program ending time point of the first program designated by the broadcast programming schedule.

3. The method of claim 1, further comprising:

providing a service of a next program following the first program on the first channel based on the broadcast programming schedule when a program ending time point elapses after transmitting the linkage control information.

4. The method of claim 1, wherein the linkage control information includes:
   a broadcast stream identification (Id) of a broadcast stream associated with a service list table which includes the target service,
   a provider Id of a provider associated with the service list table,
   a target service Id of the target service,
   a service category of the target service,
   a broadband access required element for indicating whether a broadband access is required for a receiver to make a presentation of the target service, and
   a service capabilities element required for decoding and presenting content of the target service, and
wherein the linkage control information is transmitted in service signalling related to the current service of the first program.

5. The method of claim 1, further comprising:

terminating the current service of the first program on the first channel at the linkage deactivation time included in the linkage control information; and initiating the target service related to the first program on the second channel at the linkage activation time included in the linkage control information before the current service of the first program is terminated on the first channel.

6. The method of claim 1, further comprising:

terminating another program if the other program is provided on the second channel at the linkage activation time.

7. A broadcast providing apparatus for providing a broadcasting service, comprising:

a processor configured to monitor whether a channel change event occurs while a current service of a first program is provided on a first channel based on a broadcast programming schedule of the first channel; and a communication unit, comprising a transmitter and a receiver, configured to transmit, to a terminal apparatus, linkage control information required for receiving a target service related to the first program on a second channel before the current service of the first program is terminated on the first channel by a broadcast programming schedule, wherein the linkage control information includes:
   a linkage type indicator for indicating a linkage relationship between the current service and the target service as either a program continuity or a service replacement,
   a linkage activation time indicating a first moment when a linkage of the current service of the first program and the target service is active, and
   a linkage deactivation time indicating a last moment when the linkage of the current service of the first program and the target service is active, wherein the first channel is provided through a broadcast channel and the second channel is provided through a broadband channel, wherein, in response to the linkage type indicator being set to a first value indicating the program continuity, the linkage relationship between the current service and the target service is activated after the first moment indicated by the linkage activation time, and the linkage relationship with the current service is deactivated after the last moment indicated by the linkage deactivation time, and wherein, in response to the linkage type indicator being set to a second value indicating the service replacement, the target service is selected by the terminal apparatus at the last moment indicated by the linkage deactivation time.

8. The broadcast providing apparatus of claim 7, wherein the channel change event comprises: recognizing that it is expected that the current service of the first program is not terminated at a program ending time point of the first program designated by the broadcast programming schedule.

9. The broadcast providing apparatus of claim 7, wherein the processor is configured to provide a service of a next program following the first program on the first channel based on the broadcast programming schedule when a program ending time point elapses after transmitting the linkage control information.

10. The broadcast providing apparatus of claim 7, wherein the linkage control information includes:
   a broadcast stream identification (Id) of a broadcast stream associated with a service list table which includes the target service,
   a provider Id of a provider associated with the service list table,
   a target service Id of the target service,
   a service category of the target service,
   a broadband access required element for indicating whether a broadband access is required for a receiver to make a presentation of the target service, and
   a service capabilities element required for decoding and presenting content of the target service, and wherein the linkage control information is transmitted in service signalling related to the current service of the first program.

11. The broadcast providing apparatus of claim 7, wherein the processor is configured to:
   terminate the current service of the first program on the first channel at the linkage deactivation time included in the linkage control information, and
   initiate the target service related to the first program on the second channel at the linkage activation time included in the linkage control information before the current service of the first program is terminated on the first channel.

12. The broadcast providing apparatus of claim 7, wherein the processor is configured to terminate another program if the other program is provided on the second channel at the linkage activation time.

13. A method for receiving a broadcasting service in a terminal apparatus, comprising:
   receiving a current service of a first program on a first channel based on a broadcast programming schedule of the first channel;
   receiving, from a broadcast providing apparatus, linkage control information required for receiving a target service related to the first program on a second channel while the current service of the first program is provided on the first channel; and
   receiving the target service related to the first program on the second channel based on the linkage control information,
   wherein the linkage control information includes:
      a linkage type indicator for indicating a linkage relationship between the current service and the target service as either a program continuity or a service replacement,
      a linkage activation time indicating a first moment when a linkage of the current service of the first program and the target service is active, and
      a linkage deactivation time indicating a last moment when the linkage of the current service of the first program and the target service is active,
   wherein the first channel is provided through a broadcast channel and the second channel is provided through a broadband channel,
   wherein, in response to the linkage type indicator being set to a first value indicating the program continuity, the linkage relationship between the current service and the target service is activated after the first moment indicated by the linkage activation time, and the linkage relationship with the current service is deactivated after the last moment indicated by the linkage deactivation time, and
   wherein, in response to the linkage type indicator being set to a second value indicating the service replacement, the target service is selected by the terminal apparatus at the last moment indicated by the linkage deactivation time.

14. The method of claim 13,
   wherein the linkage control information includes:
      a broadcast stream identification (Id) of a broadcast stream associated with a service list table which includes the target service,
      a provider Id of a provider associated with the service list table,
      a target service Id of the target service,
      a service category of the target service,
      a broadband access required element for indicating whether a broadband access is required for a receiver to make a presentation of the target service, and
      a service capabilities element required for decoding and presenting content of the target service, and
   wherein the linkage control information is transmitted in service signalling related to the current service of the first program.

15. A terminal apparatus for receiving a broadcasting service, comprising:
   a communication unit comprising a transmitter and a receiver; and
   a processor configured to control the communication unit to:
      receive a current service of a first program on a first channel based on a broadcast programming schedule of the first channel,
      receive, a broadcast providing apparatus, linkage control information required for receiving a target service related to the first program on a second channel while the current service of the first program is provided on the first channel, and
      receive the target service related to the first program on the second channel based on the linkage control information,
   wherein the linkage control information includes:
      a linkage type indicator for indicating a linkage relationship between the current service and the target service as either a program continuity or a service replacement,
      a linkage activation time indicating a first moment when a linkage of the current service of the first program and the target service is active, and
      a linkage deactivation time indicating a last moment when the linkage of the current service of the first program and the target service is active,
   wherein the first channel is provided through a broadcast channel and the second channel is provided through a broadband channel,
   wherein, in response to the linkage type indicator being set to a first value indicating the program continuity, the linkage relationship between the current service and the target service is activated after the first moment indicated by the linkage activation time, and the linkage relationship with the current service is deactivated after the last moment indicated by the linkage deactivation time, and
   wherein, in response to the linkage type indicator being set to a second value indicating the service replacement, the target service is selected by the terminal apparatus at the last moment indicated by the linkage deactivation time.

16. The terminal apparatus of claim 15,
   wherein the linkage control information includes:
      a broadcast stream identification (Id) of a broadcast stream associated with a service list table which includes the target service,
      a provider Id of a provider associated with the service list table,
      a target service Id of the target service,
      a service category of the target service,
      a broadband access required element for indicating whether a broadband access is required for a receiver to make a presentation of the target service, and
      a service capabilities element required for decoding and presenting content of the target service, and wherein the linkage control information is transmitted in service signalling related to the current service of the first program.

17. The method of claim 13, wherein the linkage control information is transmitted according to an occurrence of a channel change event, and wherein the channel change event comprises recognizing that the current service of the first program is not terminated at a program ending time point of the first program designated by the broadcast programming schedule.

18. The method of claim 13, wherein the current service of the first program is terminated on the first channel at the linkage deactivation time included in the linkage control information, and wherein the target service related to the first program is initiated on the second channel at the linkage activation time included in the linkage control information before the current service of the first program is terminated on the first channel.

19. The terminal apparatus of claim 15, wherein the linkage control information is transmitted according to occurrence of a channel change event, and wherein the channel change event comprises recognizing that the current service of the first program is not terminated at a program ending time point of the first program designated by the broadcast programming schedule.

20. The terminal apparatus of claim 15, wherein the current service of the first program is terminated on the first channel at the linkage deactivation time included in the linkage control information, and wherein the target service related to the first program is initiated on the second channel at the linkage activation time included in the linkage control information before the current service of the first program is terminated on the first channel.

* * * * *